Nov. 10, 1959   G. NEUHAUS   2,911,989
FLOW DIVIDER
Filed May 27, 1954

Inventor:
Gustav Neuhaus
By
Walter Becker
Patent Agent

United States Patent Office 2,911,989
Patented Nov. 10, 1959

2,911,989

FLOW DIVIDER

Gustav Neuhaus, Essen-Stadtwald, Germany

Application May 27, 1954, Serial No. 432,743

Claims priority, application Germany June 2, 1953

4 Claims. (Cl. 137—82)

The present invention relates to flow divider for use in connection with the measuring of the flow of gases through pipes and the like, and, more specifically, relates to flow divider with a diaphragm valve. With valves of this type, it is unavoidable that, after a period of time, the valve body and valve seat will wear during operation so that the precision of the instrument will decrease.

It is, therefore, an object of the present invention to provide a flow divider with a diaphragm valve, which will allow a fine relative adjustment of the valve seat and valve body so as at all times to maintain the initial precision of said flow divider, while the valve seat is so supported by the valve casing that all of the parts involved, such as the diaphragm, valve body, and valve seat, are reliably safeguarded against damage.

It is another object of this invention so to arrange the valve seat that correct measurements will be assured regardless of the overpressure existing in the main pipe the flow of which is to be measured, and consequently also in the flow divider.

Figure 1:
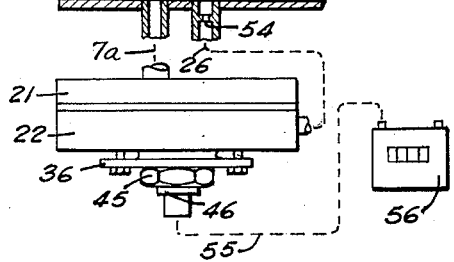

These and other objects and advantages of the invention will appear more clearly from the following specification in connection with the accompanying drawing, in which:

Fig. 1 diagrammatically illustrates the hook up of a flow divider according to the present invention with a flow meter and with a flow pipe and restrictor therein.

Figure 2:
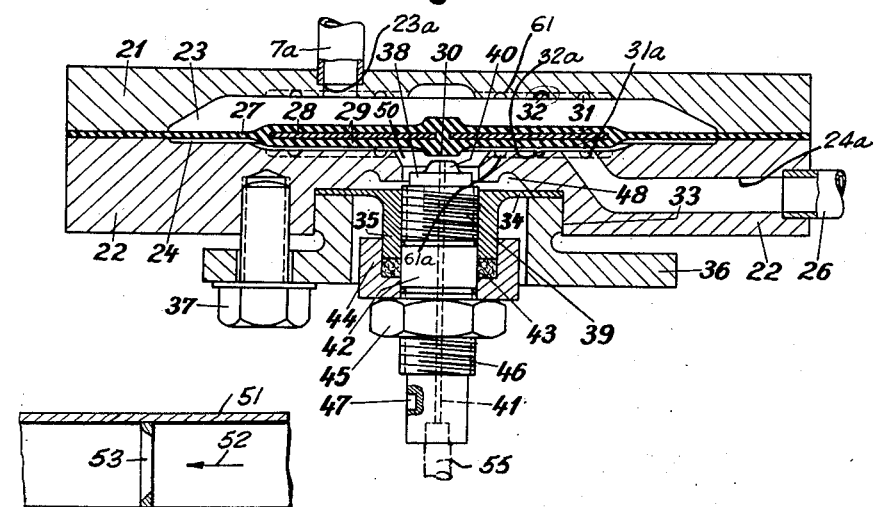

Fig. 2 represents a central vertical section through an embodiment of a flow divider according to the invention.

Referring now to the drawing in detail and Fig. 1 thereof in particular, the arrangement shown therein comprises a main line or flow pipe 51 in which the fluid to be measured is assumed to flow in the direction of the arrow 52. The flow pipe 51 is provided with a restrictor 53 which is shown in Fig. 1 as orifice plate but may, of course, be of any other customary type such as a Venturi nozzle. Conduits 26 and 7a respectively branch off from pipe 51 ahead and behind restrictor 53 and lead to the flow divider casing 21, 22. The conduit 26 is in a manner known per se provided with a small throttle 54 which latter does not form a part of the present invention.

With reference to Fig. 2, the flow divider comprises a valve casing composed of a valve casing section 21 and a valve casing section 22 having mounted therebetween a diaphragm 27. The diaphragm forms with the valve casing section 21 a first chamber 23, and with the valve casing section 22 a second chamber 24. The chamber 23 comprises a bore 23a adapted through conduit 7a to communicate with the main pipe 51 past the restrictor, while the chamber 24 is adapted through a bore 24a and conduit 26 to communicate with the main pipe ahead of said restrictor. While the marginal portion of the diaphragm 27 consists of an elastic material only, for instance rubber or the like, the central portion of the diaphragm is reinforced by a metal plate or disc 28 inserted in a thicker central portion of the diaphragm so that the metal plate is covered on all sides by a protective layer 29 which may, for instance, be of rubber. The central reinforced portion of the diaphragm carries a valve body 30. Those wall portions of the casing sections 21 and 22 which confine the chambers 23 and 24 and respectively face the diaphragm are provided with annular grooves 31 and 61, and 31a and 61a, respectively and are also provided with radial grooves 32 and 32a respectively. The purpose of these grooves consists in allowing gas to enter between the inner casing wall sections carrying said grooves and the diaphragm surfaces which may be contacted thereby, in order to prevent a sticking of the diaphragm to said inner wall sections.

The casing section 22 has a bore 33 in which is inserted a relatively thin and slightly resilient annular disc or plate 34 having connected thereto a central sleeve 35. The resilient annular disc or plate 34 which may be integral with the sleeve 35 is clamped against the casing section 22 by a gland-like member 36 connected to the section 22 by screws 37. The bore of sleeve 35 is provided with a thread threadedly engaged by a threaded bolt 38 having a tip 40 forming the valve seat. Bolt 38 is provided with an axial longitudinal bore 41 for connection with a conduit or hose 55 leading to the measuring instrument proper, for instance a gas meter 56 (Fig. 1). The threaded section 39 of bolt 38 is followed by a smooth cylindrical section 42 which is surrounded by a stuffing box packing 43 which in its turn is compressed and held in position by a cap 44. The said cylindrical section 42 of the bolt 38 is then followed by a threaded section 46 having mounted thereon a nut 45 arranged for engagement with the cap 44. It will be obvious from the drawing that turning the nut 45 in one direction will cause cap 44 to compress packing 43, while turning of nut 45 in opposite direction will allow removal of cap 44 and packing 43. The outermost end of bolt 38 is also designed as a cylindrical section having a diameter less than the diameter of the threaded section 46. This last mentioned cylindrical section is provided with a depression 47 for engagement with the hook of a corresponding wrench to allow rotation of the bolt 38 for purpose of adjusting said bolt and thereby the valve seat 40 in axial direction of the bolt. As will also be clearly visible from Fig. 2, the casing section 22 has the central outer surface thereof which faces plate 34 provided with an annular depression or bore 48. This depression 48 communicates through a bore 50 with the chamber 24 through radial groove 32. Thus, the gas contained in chamber 24 will through bores 50 and 48 act upon plate 34 and sleeve 35 connected thereto. Assuming that for reason of wear of either or both of the valve body 30 and valve seat 40 or for any other reason a relative adjustment between these two members has to be effected, first the hose or conduit 55 is removed from the outermost portion of bolt 38. Thereupon nut 45 is loosened, and finally by engagement of the depression 47 by means of a corresponding wrench, bolt 38 is turned in one or the other direction depending on whether the valve seat is to be moved toward or away from the valve member 30. After the desired adjustment has been effected, nut 45 is again tightened to thereby arrest bolt 38 relative to the casing 21, 22 while simultaneously compressing packing 43 to effect a proper seal between bolt 38 and the adjacent parts and sleeve 35 and cap 44.

While the sealing is shown as a stuffing box packing, and represents a preferred sealing because it prevents the valve seat member 40 from carrying out any undesired turning movement, also seals of other types, for instance a liplike seal, may be employed.

When the valve seat 40 is to be adjusted relative to the valve body 30, the somewhat resilient plate 34 safeguards the valve body, valve seat and diaphragm against damage in the event that the valve seat is brought thereby too close to the valve body. In the same manner the plate 34 can yield to a certain extent in the case of shocks occurring during measuring.

Moreover the suspension of the bolt 38 in the slightly resilient plate 34 has another very important advantage as will presently appear. As has been mentioned above, the pressure prevailing in the chamber 24 acts through the radial grooves 32a and axial bore 50 and the bore or depression 48 upon the somewhat resilient plate 34. Consequently, this pressure tends to push the sleeve 35 outwardly and can do so since as mentioned above the sleeve 35 is suspended on the somewhat resilient plate 34. Thus, wherever plate 34 due to the pressure acting upon the sleeve 35 yields toward the outside, the valve seat 40 is moved away from the valve body 30. It should also be kept in mind that the valve body 30 can move toward the valve seat 40 only up to a certain extent because the central portion of the diaphragm 27 has a certain stiffness brought about by the inserted plate 28. As is well known, the quantity of fluid discharged through the bore 41 is dependent on the difference in pressure ahead and past the restrictor and consequently is dependent on the pressure in the chambers 24 and 23. It has been found that the quantity of fluid being discharged through the bore 41 is also influenced by the pressure of the fluid in the pipe (the static pressure) the fluid flow of which is to be measured, which means that the quantity of fluid being discharged through the bore 41 is also influenced by the pressure in the flow divider, especially the pressure in the chamber 24. This is due to the fact that the position of the diaphragm is also influenced by the suction at the valve 30, 40 which has the tendency to draw the valve body 30 closer to the valve seat 40. If the valve body 40 is rigidly supported and were so adjusted that it will counteract a certain pressure to thereby allow the proper branched-off stream to flow through bore 41, it will be obvious that if the suction increases, the flow through bore 41 would be insufficient unless a corresponding adjustment of the valve seat 40 were effected. However, inasmuch as with the arrangement of Fig. 2 the plate 34 supports the sleeve 35 and thereby the valve seat 40 in a somewhat resilient manner and, since as outlined above, with increasing pressure in chamber 24, the plate 34 and sleeve 35 yield toward the outside so that the effective distance between the valve seat 40 and valve body is increased, it will be evident that also at this higher pressure the valve 30, 40 will allow the proper quantity of fluid to be discharged through bore 41.

It is, of course, to be understood that the invention is not confined to the particular showing in the drawing but also comprises any modifications within the scope of the appended claims.

What I claim as new and desire to secure by Letters Patent of the United States is:

1. In a flow divider for connection with a restrictor-equipped flow pipe, the combination of: a casing, a diaphragm supported by said casing and sub-dividing the same into a first and a second chamber, said first chamber having passage means for connection with said flow pipe behind said restrictor, and said second chamber having passage means for connection with said flow pipe ahead of said restrictor, a valve seat member resiliently supported by said casing and having an axial bore therethrough for discharging fluid from said second chamber, said valve seat member being axially adjustable selectively award or away from said diaphragm, and a valve member supported by said diaphragm for cooperation with said valve seat member to control the discharge of fluid from said second chamber into said bore.

2. In a flow divider for connection with a restrictor-equipped flow pipe, the combination of: a casing, a diaphragm supported by said casing and sub-dividing the same into a first and a second chamber, said first chamber having passage means for connection with said flow pipe behind said restrictor, and said second chamber having passage means for connection with said flow pipe ahead of said restrictor, resilient means supported by said casing and confining therewith a third chamber communicating with said second chamber, sleeve means supported by said resilient means and having a threaded bore therethrough, a valve seat member threadedly engaging said sleeve means and being supported thereby, said valve seat member having an axial bore therethrough for discharging fluid from said second chamber and being axially adjustable selectively toward or away from said diaphragm, and a valve member supported by said diaphragm for cooperation with said valve seat member to control the discharge of fluid from said second chamber into said bore.

3. A flow divider according to claim 2, in which said resilient means consists of an annular resilient metal plate partly confining said third chamber.

4. In a flow divider for connection with a restrictor-equipped flow pipe, the combination of: a casing, a diaphragm supported by said casing and sub-dividing the same into a first and a second chamber, said first chamber having passage means for connection with said flow pipe behind said restrictor, and said second chamber having passage means for connection with said flow pipe ahead of said restrictor, a stiffening insert located within the central portion of said diaphragm, said central portion of said diaphragm being arranged in response to a certain deflection of said diaphragm to abut adjacent wall portions of said casing to thereby limit the maximum deflection of said diaphragm, resilient means supported by said casing and confining therewith a third chamber communicating with said second chamber, sleeve means supported by said resilient means and having a threaded bore therethrough, a valve seat member threadedly engaging said sleeve means and being supported thereby, said valve seat member having an axial bore therethrough for discharging fluid from said second chamber and being axially adjustable selectively toward or away from said diaphragm, and a valve member supported by said diaphragm for cooperation with said valve seat member to control the discharge of fluid from said second chamber into said bore.

References Cited in the file of this patent

UNITED STATES PATENTS

| | | |
|---|---|---|
| 1,887,322 | Nettleton | Nov. 8, 1932 |
| 1,992,048 | Temple | Feb. 19, 1935 |
| 2,092,019 | Randel | Sept. 7, 1937 |
| 2,451,451 | Tate | Oct. 12, 1948 |
| 2,520,547 | Hughes | Aug. 29, 1950 |
| 2,649,714 | Griffith | Aug. 25, 1953 |
| 2,662,539 | Markson | Dec. 15, 1953 |

FOREIGN PATENTS

| | | |
|---|---|---|
| 663,526 | Great Britain | Dec. 27, 1951 |
| 825,174 | Germany | Dec. 12, 1951 |